US011424050B2

(12) United States Patent
Luhrs et al.

(10) Patent No.: US 11,424,050 B2
(45) Date of Patent: Aug. 23, 2022

(54) FABRICATION OF EXCLUDED VOLUMES TO ENHANCE ELECTRICAL CONDUCTIVITY OF POLYMERIC COMPOSITE

(71) Applicant: The United States of America, as represented by the Secretary of the Navy, Arlington, VA (US)

(72) Inventors: Claudia Catalina Luhrs, Pacific Grove, CA (US); Dragoslav Grbovic, Mountain View, CA (US); Jonathan Phillips, Pacific Grove, CA (US); Brian Christopher Earp, Carmel, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/593,873

(22) Filed: Oct. 4, 2019

(65) Prior Publication Data

US 2020/0185121 A1 Jun. 11, 2020

Related U.S. Application Data

(60) Provisional application No. 62/778,179, filed on Dec. 11, 2018.

(51) Int. Cl.

*H01B 1/22* (2006.01)
*H01B 3/12* (2006.01)

(Continued)

(52) U.S. Cl.

CPC ................ *H01B 1/22* (2013.01); *C08J 3/201* (2013.01); *C08K 3/04* (2013.01); *H01B 3/12* (2013.01);

(Continued)

(58) Field of Classification Search

CPC ..... H01B 1/22; H01B 1/24; H01B 3/12; C08J 3/201; C08K 3/04; C08K 3/041; C08K 2201/001

(Continued)

(56) References Cited

U.S. PATENT DOCUMENTS 9,214,256 B2 12/2015 Sivarajan et al.
2002/0004556 A1* 1/2002 Foulger .............. C08L 2666/04 525/70

(Continued)

OTHER PUBLICATIONS

Scaffaro "Chapter 5: Nanofilled Thermoplastic Thermoplastic Polymer Blends." Nanostructured polymer blends, pp. 133-160 (Year: 2014).*

(Continued)

*Primary Examiner* — Tri V Nguyen

(74) *Attorney, Agent, or Firm* — Naval Postgraduate School; Scott Bell

(57) ABSTRACT

A composite material with enhanced electrical conductivity. The composite material includes two distinct phases. The first distinct phase is an excluded volume phase that includes an electrical insulator. The second distinct phase, a conductor phase, is a composite including an electrically insulating matrix and an embedded conductor phase that has sufficient concentration to exceed a percolation threshold within the conductor phase.

5 Claims, 3 Drawing Sheets

(51) Int. Cl.
*C08J 3/20* (2006.01)
*C08K 3/04* (2006.01)
*H01B 3/30* (2006.01)

(52) U.S. Cl.
CPC ......... *H01B 3/30* (2013.01); *C08K 2201/001* (2013.01)

(58) Field of Classification Search
USPC ................. 252/500, 510, 511, 518.1, 519.33
See application file for complete search history.

(56) References Cited

U.S. PATENT DOCUMENTS

2004/0265550 A1 12/2004 Glatkowski et al.
2010/0283000 A1* 11/2010 Shimizu ................ C08L 101/00 252/74
2013/0269866 A1* 10/2013 Xu ........................... B05D 3/02 156/242
2017/0213616 A1* 7/2017 Bilotti ..................... C08L 23/06

OTHER PUBLICATIONS

Bar "The Electrical Behavior of Thermosetting Polymer Composites Containing Metal Plated Ceramic Filler." Polymer composites, vol. 26, Issue1, Feb. 2005, pp. 12-19 (Year: 2005).*

Harris, P.J.F. Carbon. Nanotube Composites. Int. Mater. Rev. 2004, 49, 31-43.

De Volder, M.F.L.; Tawfick, S.H.; Baughman, R.H.; Hart, A.J. Carbon Nanotubes: Present and Future Commercial Applications Science 2013, 339, 535-539.

Majidian, M.; Grimaldi, C.; Forro, L.; Magrez, A. Role of the Particle Size Polydispersity in the Electrical Conductivity of Carbon Nanotube-Epoxy Composites. Sci. Rep. 2017, 7, 12553.

Gupta, M.L.; Sydlik, S.A.; Schnorr, J.M.; Woo, D.J.; Osswald, S.; Swager, T.M.; Raghavan, D. The Effect of Mixing Methods on the Dispersion of Carbon Nanotubes during the Solvent-Free Processing of Multiwalled Carbon Nanotube/Epoxy Composites. J. Polym. Sci. Part B Polym. Phys. 2013, 51, 410-420.

* cited by examiner

FABRICATION OF EXCLUDED VOLUMES TO ENHANCE ELECTRICAL CONDUCTIVITY OF POLYMERIC COMPOSITE

RELATION TO OTHER APPLICATIONS

This application claims priority to and the benefit of U.S. Application No. 62/778,179 filed Dec. 11, 2018, which is hereby incorporated in its entirety by reference.

FIELD OF THE INVENTION

The present invention is directed to a composite composed largely of non-conductive particles forming ‘excluded volumes’, where conductive particles embedded in a non-conductive polymeric matrix form a conductive network that is relegated to the interstitial volume.

BACKGROUND

Electrically and/or thermally conductive polymeric composites, consisting of an insulating polymeric matrix and a highly conductive filler, are widely used in electronic applications such as adhesives, solderless connectors, thermistors, pressure sensing elements, electromagnetic shielding and antistatic devices among others. Another potential use for thermally conductive composites could be integrated circuit packages.

Conductive composites typically consist of an insulating polymeric matrix and a highly conductive filler. Examples of electrically conductive fillers include, but are not limited to, metal and/or alloy particulates, carbon nano and micron size structures (fibers, tubes, sheets and particles) among other conductive materials. Thermally conductive, but non-electrically conductive fillers include, but are not limited to, boron nitride and diamond. Polymeric thermoset matrices include, but are not limited to epoxies, polyesters, silicones and phenolic resins. The matrix can also include thermoplastics such as acrylonitrile butadiene styrene, acrylics, polyethylene, polypropylene, polystyrene, polyphenylene sulfide, polyimide, polyetherimide, nylon, or other engineering polymers.

Dispersion methods can be used to allow for the formation of homogeneous composites or create composites where non-conductive “excluded volumes” are formed by serendipity or determined by the conductive filler geometry and not in a designed-engineered manner. Further, carbon nanotubes or graphite sheets can be used to create transparent yet conductive films for deposition on substrates and for the ability to pattern. The focus in this case is to print layers and patterns of conductive, transparent material but is not concerned with thermal transport or building 3-dimensional objects. For example, these transparent, electrically conductive films have been used in touch-screens.

SUMMARY

Embodiments in accordance with the invention relate a composite material with enhanced electrical conductivity. In short, the composite material includes two distinct phases. The first distinct phase is an excluded volume phase that includes an electrical insulator. The second distinct phase, a conductor phase, is a composite including an electrically insulating matrix and an embedded conductor phase that has sufficient concentration to exceed a percolation threshold within the conductor phase.

In some embodiments, the excluded volume phase is an electrically insulating resin. In some embodiments, the embedded conductor phase includes a highly electrically conductive filler. In some embodiments, the embedded conductor phase includes a carbon allotrope, a metal, or a conductive oxide.

In some embodiments, the excluded volume phase is at least 50% of a total volume of the composite material. In some embodiments, the embedded conductor phase in the conductor phase is less than 1% of a total volume of the composite material. In some embodiments, the two distinct phases are chemically or mechanically immiscible.

In some embodiments, the excluded volume phase is a polymeric resin or a ceramic insulating material. In some embodiments, the embedded conductor phase includes particles, fibers, tubes or sheets of an electrically conductive material. The embedded conductor phase may include embedded electrically conductive carbon, embedded electrically conductive metal, or embedded electrically conductive oxide.

In some embodiments, the two distinct phases are mixed but remain largely segregated because a mixing technique employed to create the composite material limits mixing of the excluded volume phase and the conductor phase.

Embodiments in accordance with the invention are best understood by reference to the following detailed description when read in conjunction with the accompanying drawings.

Figure 1A:
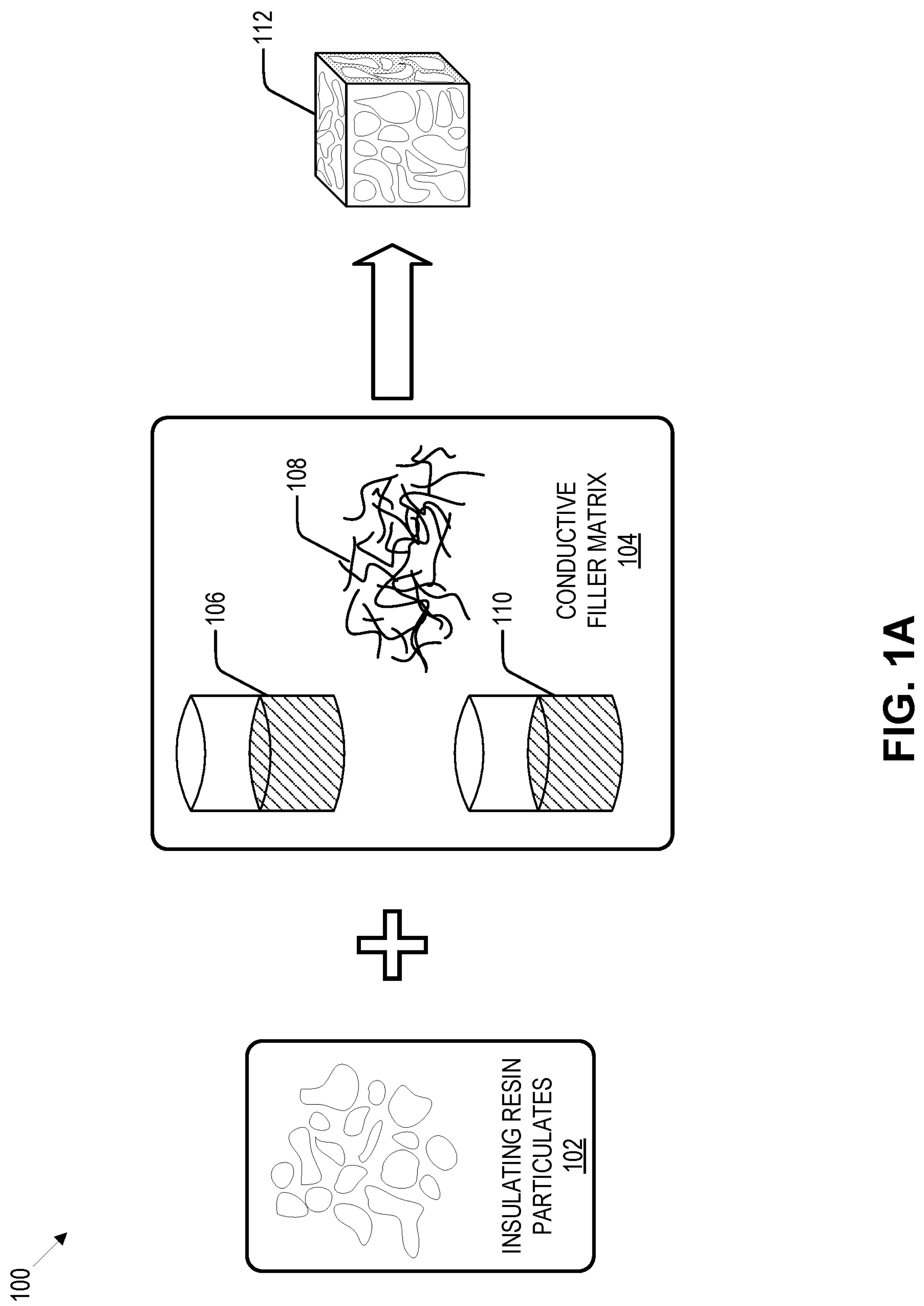
FIGS. 1A and 1B illustrate techniques for creating a polymer composite.

Embodiments in accordance with the invention are further described herein with reference to the drawings.

DETAILED DESCRIPTION

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms “a”, “an”, and “the” include plural references unless the context clearly dictates otherwise. Furthermore, the terms “a” (or “an”), “one or more” and “at least one” can be used interchangeably herein. The terms “comprising”, “including”, “having” and “constructed from” can also be used interchangeably.

In order for conductive polymeric composites to reach the values of conductivity needed for the applications described in the background above, one or more of the scenarios below should be present:

Conductive filler particulates added in sufficient amount to the matrix material to allow the individual particulates to connect with each other, creating a conductive path. That is, filler loadings high enough to produce percolation and produce a conductive composite.

Conductive fillers with a high aspect ratio (e.g. tubes, sheets, fibers) to allow for a conductive path to form within the matrix at lower filler loadings than the loading required in scenario 1

The distribution of the conductive fillers in an inhomogeneous fashion such that the conductive filler material is only found in a fraction of the total volume (the interstitial volume). This is achieved by excluding the conductive filler material from parts of the matrix, herein referred to as "excluded zones."

Embodiments of the invention relate to a technique for creating a composite composed largely of non-conductive particles forming 'excluded volumes', where conductive particles are relegated to the interstitial volume as described above. In some cases, the technique includes combining (A) non-conductive particles forming excluded volumes and (B) a second material, composed of a mixture of two components: i) insulating polymeric component and ii) conductive filler. For example, (A) insulating particulates can be mixed with (B) an uncured resin-conductive filler-hardener mixture before the cross-linking reaction takes place in the case of thermoset polymers. In another example, (A) non-conductive particles forming excluded volumes can be mixed with (B) a melted polymer-conductive filler mixture while still in a viscous state, in the case of thermoplastics. Notably, the components A and B can be mixed in any volumetric ratio.

FIG. 1A illustrates a technique for combining the electrically insulating material (non-conductive particles forming excluded volumes) 102 and a conductive phase (conductive filler with insulating polymer mixture) 104 to create a polymer composite 112. As is the case with the other workflows described herein, various embodiments may not include all of the steps described below, may include additional steps, and may sequence the steps differently. Accordingly, the specific arrangement of steps shown in FIGS. 1A-1B should not be construed as limiting the scope of creating a conductive polymer composite with an excluded zone.

Initially, insulating material 102 is prepared. For example, particulates of an electrically insulating material can be arranged to form non-conductive particles that will form the 'excluded volumes'. In another example, solid insulating polymeric resin ranging in size from nanometric to micrometric are used to form an excluded zone. The electrically insulating material 102 can also be a ceramic insulating material such as particles of alumina, silica, titania, magnesia, etc.

The insulating material 102 (i.e., excluded volume phase) is combined with a conductive phase 104. In FIG. 1A, the conductive phase 104 is initially viscous and only includes resin 106 and conductive filler particulates 108 such as an electronically conductive carbon, metal or oxide. Examples of electronically conductive carbon include carbon nanoparticles, nanotubes, nanofibers or graphene; examples of electronically conductive metal include metal nanoparticles, nanotubes or nanofibers.

After the insulating material 102 and the conductive phase 104 are combined, a hardener 110 is added to harden the resin 106 and create the polymer composite 112. The insulating material 102 is effectively an "excluded volume;" thus, the conductive filler particulates 108 are only distributed in the interstitial regions corresponding to the conductive phase 104 in the polymer composite 112.

In some embodiments, the two distinct phases (insulating material 102 and conductive phase 104) are chemically or mechanically immiscible. In other embodiments, the two distinct phases are mixed but remain largely segregated because the technique employed to make the composite limits the mixing of the insulating material 102 and conductive phase 104.

Figure 1B:
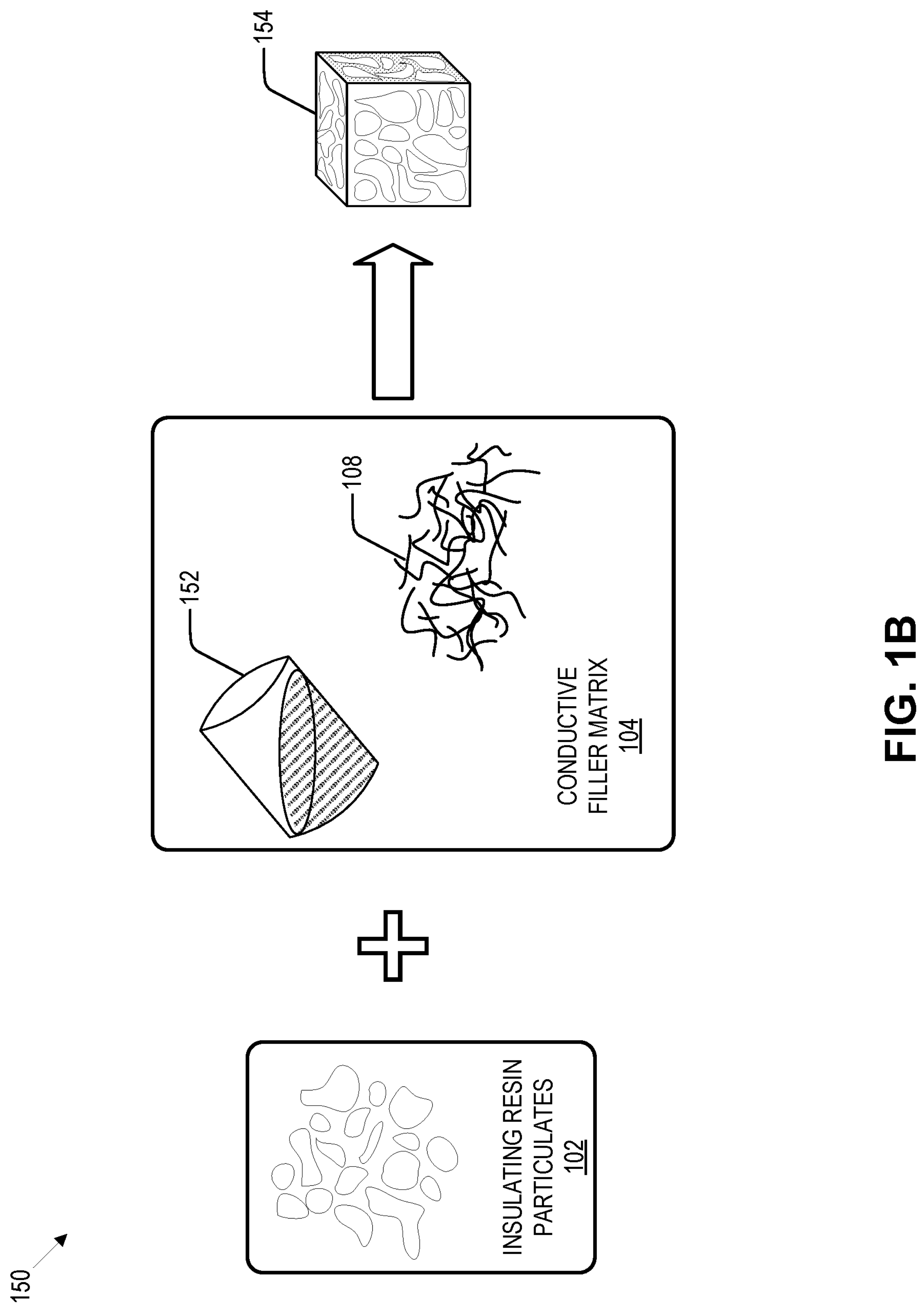

FIG. 1B illustrates an alternate technique for combining electrically insulating material 102 and a conductive phase 104 to create a polymer composite 112. The conductive phase 104 is a combination of a melted polymer 152 and conductive filler particulates 108. The conductive phase 104 can be introduced into the electrically insulating material 102, where the conductive phase 104 is then allowed to solidify to form the polymer composite 112.

In FIGS. 1A and 1B, conductive filler particulates 108 can be introduced to the resin 106 or melted polymer 152 using various mixing protocols.

In some cases, the required amount of conductive phase is proportional to the interstitial volume. For example, the insulating material 102 can occupy as much as 99% of the total volume of the polymer composite 112. The amount of conductive phase is therefore as low as 1% of the total volume of the polymer composite 112. In this example, the required amount of conductive media necessary to create a percolation path could be of the order 1% of the amount required if the composite were made only of the conductive phase 104. In other words, adding insulating material 102 of designed size and geometries effectively increases the conductive filler 108 loading in the interstitial regions of the matrix, effectively targeting only a portion of the matrix to be highly conductive and increasing the probability of forming a continuous conductive network at overall lower conductive filler 108 loadings.

Using the techniques described above, the conductivity of the polymer composite 112 is higher at lower loadings of conductive filler 108 and less influenced by the dispersion method used to mix the matrix and the conductive filler 108, settling issues or curing conditions. Further, because the insulating material 102 is of a similar nature to the resin 106 or melted polymer 152, it is assured that the conductive phase 104 can easily adhere to the insulating material 102, which (1) prevents delamination issues that tend to affect the mechanical properties of the polymer composite 112 and (2) avoids issues experienced when materials with different expansion coefficients or reactivity are employed.

In some embodiments when i) the insulating material 102 is composed of spheres of radius 10, ii) the conductive filler 108 is composed of particles of diameter 1 and, where iii) the conductive filler 108 is excluded from the interior of the non-conductive phase spheres 102, which is approximately 70% of the total volume in a close packed configuration), then the conductive phase 104 will only be located in the interstitial volume not occupied by the electrical and/or thermal non-conducting spheres 102. In this case, a percolation path through the material will form at a far lower loading percent of the conductive phase 108 than in the case where no excluded volume is used.

The minimum amount of conductive material 108 required to create a percolation path is a function of the conductive phase material shape. In an example using perfectly packed, impermeable, solid spheres for the insulating material 102 that are randomly placed, approximately 70% of the material is non-conductive spheres, hence "excluded volume." Thus, the conductive media 108 is only found in 30% of the gross volume. In another example, the polymer composite 112 comprises the same materials as above but the non-conductive, impermeable spheres are deformable such that in compression the non-conductive, impermeable phase 102 fills approximately 99% of the entire three-dimensional volume. In this case, the conductive media 108 would be restricted to 1% of the gross volume. Accordingly, the net amount of conductive material required to create a percolation path is only 1% of the amount in a composite where there is no excluded volume.

In some embodiments, the conductive media 108 used is carbon nanotubes (CNT's). Testing indicates that as the CNT loading of the conductive phase 104 increases above 0.1% wt (low loading) there is a gradual increase in conductivity, anticipated for percolation-based conduction. Further, the mixing protocol has an effect on the conductivity. At any particular CNT loading within the "low loading" regime, the best conductivity is found for minimal mixing. In the minimal mixing case, the CNT are not homogenously distributed but rather are found collected in relatively high concentration 'bunches' or 'strings' distributed randomly. In conclusion, experiments show that to create a high conductivity epoxy—CNT composite in which there is only a low concentration (ca.<1%) of CNT, it is best to avoid intensive mixing of the CNTs into the matrix and to conduct an accelerated cure at higher temperature.

Much of the simple heuristic discussed above for the low loading samples is consistent with theory. Based on the theory of percolation for high aspect ratio (e.g., CNT) conductive phase, percolation paths can form at low loadings. Moreover, as demonstrated using scanning electron microscopy, inhomogeneous microstructures, featuring excluded volumes, can form when little mixing is employed in the production protocol. As discussed in the relevant literature, limiting the conductive phase (CNT) to a fraction of the total matrix volume increases the local CNT density; hence, increasing the effective density of the conductive phase locally. Although the gross conductive phase density is below the percolation threshold, in these zones the conductive phase concentration is above the percolation threshold. This leads to 'local' percolation paths between sections of 'above percolation threshold' phase concentration. Accordingly, percolation can begin at lower net average concentrations for poorly mixed composites with inhomogeously distributed conductive phase, than for homogenous, that is well-mixed, samples with a nearly homogenous distribution of the conductive phase. In the latter, no sections, or too few sections, with 'above percolation threshold' conductive phase concentrations are found.

Thus, theory and experiment both indicate a poorly mixed sample behaves, in terms of net conductivity, much like a well-mixed composite with a much greater gross conductive component loading.

The theory also explains behavior observed at "extremely low loadings" (less than 0.1% wt of CNT. Theory indicates that with or without mixing, a sharp drop in conductivity is anticipated at some critical conductive phase concentration, below which percolation paths cannot form, that is below the 'percolation threshold' concentration. Testing related to the embodiments herein show a sharp drop in conductivity for CNT concentrations below about 0.1% wt.

The above model of local concentrations exceeding the 'percolation threshold' do not explain all observations. There is a category of loading, extremely low loading, in which even locally there is insufficient concentration for creating zones with 'above percolation concentration'. However, samples with extremely low CNT loading values still show conductivity orders of magnitude higher than the matrix alone. This requires a model other than percolation, such as the dielectric breakdown between conductors as observed in capacitors.

Based on the physical characteristics observed for samples with "low loadings" (>0.1%) and "extremely low loadings" (<0.1%), the resistivity data resulting from testing of composites described here can be understood:

For the low CNT concentration samples, a "percolating" conductive network forms when the matrix is inhomogeneous, specifically, when the CNTs are confined to only a fraction of the total volume. Any process, including the use of beads, or an increase in the number of dispersion cycles, that increases the homogeneity of the CNT dispersion by breaking down the "excluded volumes," invariably increases the distance between conductive strands, hence reducing the connectivity and concomitantly the macroscopic conductivity.

In contrast, samples that contain extremely low CNT loadings (0.014% wt) are already isolated from each other and present minimal effects due to higher levels of dispersion and favor the conduction of electrons when higher currents are applied. Moreover, the specimens with extremely low CNT concentrations tend to have higher standard deviations, thus, the effects of other parameters tend to fall within the expected test board location-to-location variability.

Figure 2:
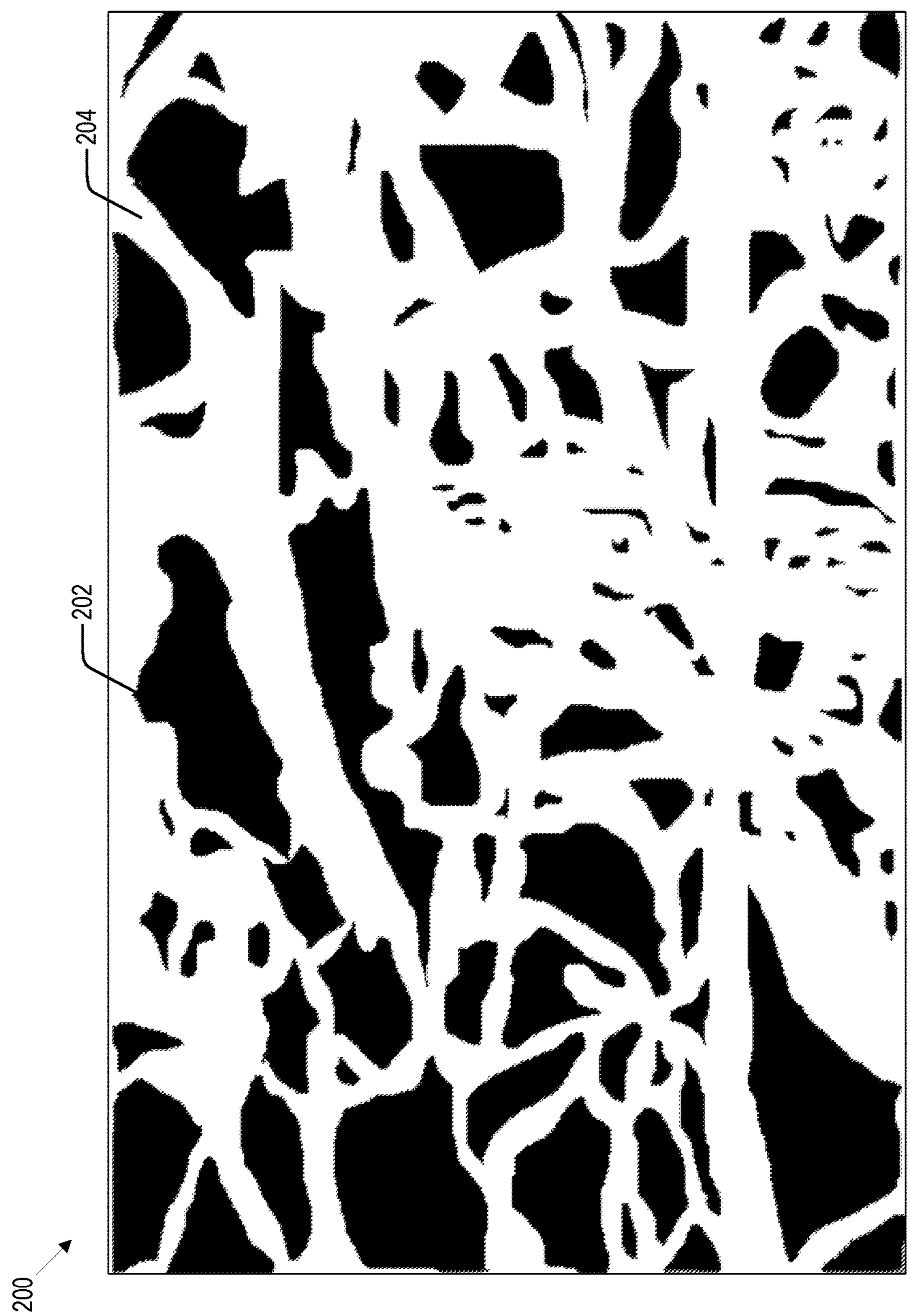
FIG. 2 shows an example excluded volume in a polymer composite.

FIG. 2 shows an example excluded volume 202 in a polymer composite 200. The excluded volume 202 may be of a non-conductive material. The interstitial volume 204 may correspond to a conductive phase that creates a conductive network as described above. The excluded volume 202 reduces the amount of conductive filler that is required to create the conductive network in the interstitial volume 204.

As discussed above, the excluded volume 202 increases the ability of fillers to form networks by confining them to only a fraction of the total volume of the matrix. Excluded volume 202 is the volume of the matrix where filler is not found at any concentration. Given an unchanged total filler fraction, the existence of excluded volumes 202 will increase the concentration of filler in all the interstitial volume 204. This increase in concentration permits percolating paths of both spherical and high aspect ratio conductive filler to form at lower net loadings through connected interstitial volumes 204 than would be required for homogeneous distributions.

The previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of fabricating a polymeric composite, the method comprising:

melting particles of an electrical insulator, wherein the particles each have a diameter of approximately 1 unit;

minimally mixing the melted electrical insulator and carbon nanotubes to create a conductor phase in a viscous state, wherein the carbon nanotubes are collected in bunches or strings randomly and nonhomogenously distributed in the conductor phase;

combining the conductor phase with an excluded volume phase that comprises material spheres of a polymeric material, wherein each of the material spheres has a radius of approximately 10 units; and solidifying the melted insulator material such that:

the solidified electrical insulator material and the polymeric material form an excluded volume, and the conductive material forms a continuous conductive network.

2. The method of claim 1, wherein the polymeric material and the electrical insulator are chemically or mechanically immiscible.

3. A method of fabricating a polymeric composite, the method comprising:

minimally mixing a resin melted from particles having a diameter of approximately 1 unit and carbon nanotubes to create a conductor phase in a viscous state, wherein the carbon nanotubes are nonhomogenously distributed in the conductor phase;

pouring the conductor phase into an excluded volume phase that comprises an arrangement of polymeric material spheres, wherein each of the material spheres has a radius of approximately 10 units; and using a hardener to solidify the conductor phase such that:

the resin and the arrangement of polymeric material spheres form an excluded volume, and the conductive material forms a continuous conductive network.

4. The method of claim 3, wherein the resin and the polymeric material spheres are chemically or mechanically immiscible.

5. The method of claim 4, wherein the excluded volume is about 99% of the gross volume of the polymeric composite.

* * * * *